United States Patent [19]

Straayer

[11] Patent Number: 4,866,464
[45] Date of Patent: Sep. 12, 1989

[54] METHOD AND APPARATUS FOR GENERATING A SCAN TIMING SIGNAL WITH DIFFUSER AND DETECTOR ARRAY

[75] Inventor: Ronald J. Straayer, South Windsor, Conn.

[73] Assignee: The Gerber Scientific Instrument Company, South Windsor, Conn.

[21] Appl. No.: 260,117

[22] Filed: Oct. 20, 1988

[51] Int. Cl.[4] .............................................. H01J 3/14
[52] U.S. Cl. .................................... 250/235; 250/236
[58] Field of Search ........... 250/234, 235, 236, 237 G; 358/293, 294; 350/6.6, 6.7, 6.8, 6.9

[56] References Cited

U.S. PATENT DOCUMENTS 4,602,154  7/1986  Taniguchi ........................... 250/235
4,613,753  9/1986  Okada et al. ........................ 250/236
4,667,099  5/1987  Arai et al. .......................... 250/235

Primary Examiner—David C. Nelms
Attorney, Agent, or Firm—McCormick, Paulding & Huber

[57] ABSTRACT

A novel apparatus for use in generating a scan timing signal in a laser raster scanner includes an optical diffuser positioned to receive a scanned reference beam through a reference mask. The diffused, modulated reference beam is presented to an array of photodetectors. The number of photodetectors in the array is selected to be sufficient so that at least two photodetectors receive the diffused modulated reference beam simultaneously as the reference beam is scanned along the reference mask.

8 Claims, 2 Drawing Sheets

METHOD AND APPARATUS FOR GENERATING A SCAN TIMING SIGNAL WITH DIFFUSER AND DETECTOR ARRAY

TECHNICAL FIELD

This invention relates to a system for generating scan reference or timing signals in laser raster scanners, and more particularly to an apparatus for generating a timing signal in a laser raster scanning inexpensively.

BACKGROUND OF THE INVENTION

High speed optical scanning systems, such as precision plotters, printers and the like are well known in the art. These devices are direct imaging systems and are used to fabricate printed circuit boards (PCB) artwork and printing plate artwork by raster scanning an exposure beam across a film which is further processed into a mask. A typical system as marketed by The Gerber Scientific Instrument Company, the assignee of the present application, consists of a magnetic tape device, hard disk, computer, interactive graphics terminal, image processor, optical table having a movable write platen for positioning the substrate and a precision laser scanner. The system also includes such optics, media carriage and electronics as is necessary to directly transfer computer aided design (CAD) data to the printed circuit board artwork or transfer fonts, graphics and half toned images into printing plate artwork.

In operation, a direct imaging system is configured to receive on the write platen a planar substrate of aluminum (in the case of graphic arts) or copper clad dielectric (in the case of a printed circuit board) which has an optically sensitive photopolymer applied to its upper surface. The computer modulators the intensity of an optical beam, usually provided by a laser, to expose selected portions of the substrate. Typically, there is a second, reference beam scanned simultaneously with the exposing beam for generating a scan timing signal and for accurately controlling the position of the exposing or write beam on the substrate. A flat field scanning system is sometimes employed to focus the beams to small spots and to accomplish the simultaneous scanning of the beam across a reference mask and the substrate, respectively. Precision air bearings are often used to guide the write platen as the substrate is imaged.

The reference beam scans a precision target which typically consists of a linear array of transparent and opaque bars on a substrate (i.e. 1 mil. transparent/1 mil. opaque). After modulation by this target the light is typically gathered by a linear array of optical fibers positioned behind the reference mask and registered with the scan line. As the reference beam traverses the scan line and is mounted by the target, light enters the optical fibers and is received by one or more photodetectors. A controller uses the output signal from the photodetectors to generate a clock signal.

To extend over a typical scan line length of twenty inches, the linear array of optical fibers must comprise a great many optical fibers. Moreover, nonuniform attenuation by different fibers can cause timing errors. Known devices for generating scan timing signals in large raster scanners are therefore expensive and prone to error.

SUMMARY OF THE INVENTION

An object of the present invention is to provide an apparatus for use in generating a timing signal by diffusing a modulated reference beam to enhance photodetection.

Another object of the present invention is to provide a laser raster scanner having a timing signal generated in a simple and inexpensive manner.

According to the present invention, in a laser raster scanner that simultaneously scans, along respective scan lines, a reference beam across a reference mask having spaced transparent regions, and an exposure beam across a substrate, an apparatus for generating signals indicative of a position of the beam includes an optical diffuser that is positioned subsequent to the reference mask to receive the reference beam along the referenced scan line and a transparent light pipe collector for constraining the diffused energy. A detector array is positioned subsequent to the optical collector and includes a plurality of photodetectors spaced along the reference beam scan line, these detectors receive the modulated reference beam and provide electrical signal equivalents thereof.

DESCRIPTION OF THE PREFERRED EMBODIMENT

Figure 1:
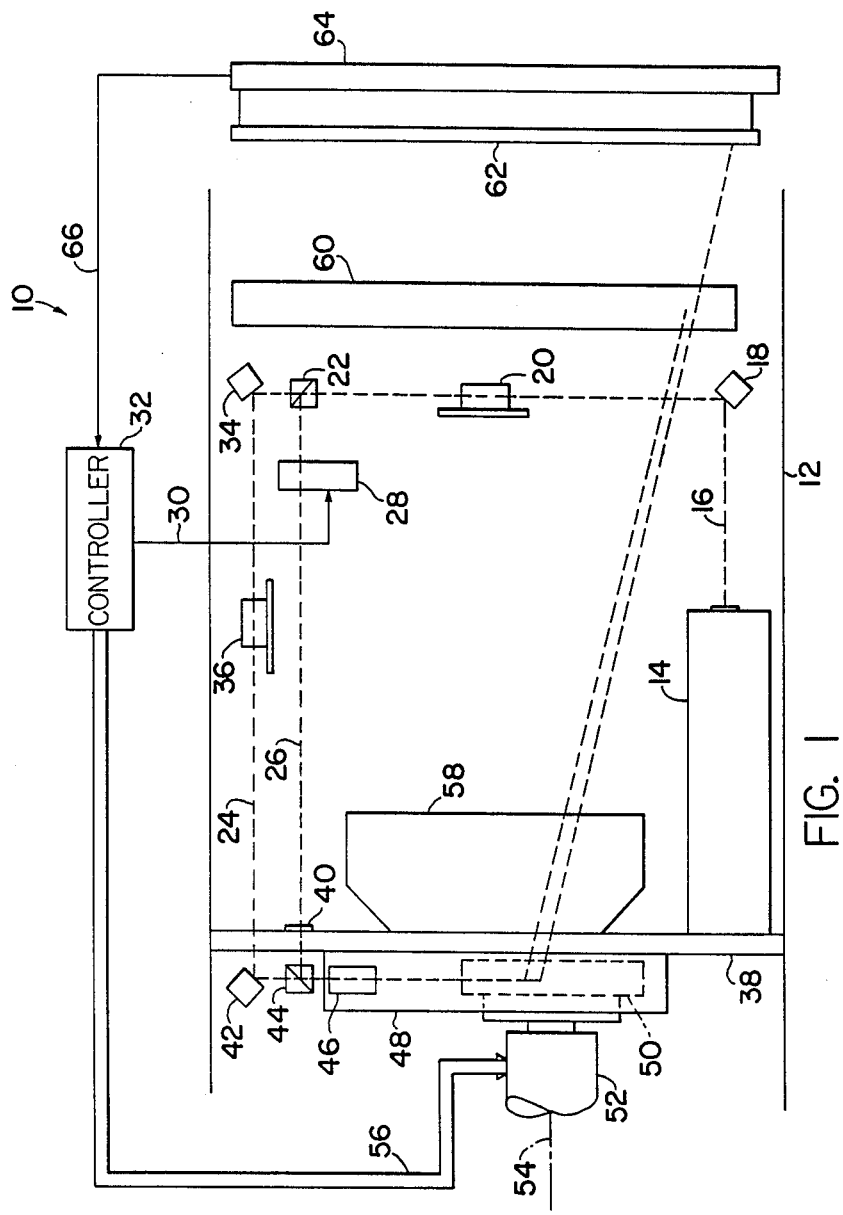
FIG. 1 is a schematic illustration of a laser raster scanner having an apparatus for generating a timing signal provided in accordance with the present invention.

Referring now to FIG. 1, there is schematically shown a top illustration of a laser raster scanner 10. The scanner is housed in case 12. An optical source 14, preferably a Cyonics 3 Mw Argon laser, provides a beam 16 which is received by a first turning mirror 18 and presented to beam forming optics 20. The beam forming optics is conventional and can comprise a bandwidth lens, negative lens, pinhole and a transform lens assembly as is required by the specific application.

The formed beam is received by a first beam splitter 22 which splits the beam into reference beam 24 and exposure beam 26. The exposure beam is presented to a conventional acousto-optic modulator 28 that modulates the beam in response to control signals received on lines 30 from controller 32. Similarly, reference beam 24 is turned by second turning mirror 34 and is presented to reference beam forming optics 36 which typically includes lenses and other optical components similar to those beam forming components detailed above.

The reference beam is passed through an opening in bulkhead 30, while the exposure beam is passed through aperture 40. The reference beam is received by turning mirror 42 and presented to beam combiner 44. Beam combiner 44 also receives the exposure beam, and presents a combined output beam to collimating lens 46 in prism assembly 48.

As is conventional, the combined beam is received by an optical polygon 50 housed on spindle assembly 52. The polygon is rotated about an axis 54 in a conventional manner in response to control signals received from controller 32 on lines 56. The beams exit from the polygon surface and are received by a conventional F · theta scan lens 58. The exposure beam is received by final folding mirror 60 and presented to a write platen out of the plane of the scanner, not shown and not part of the present invention. The reference beam is simultaneously presented to reference mask 62 and ultimately received by photodetector assembly 64. The photodetector assembly 64 provides signals indicative of the received reference beam to the controller on lines 66 for controlling the timing, and hence the modulation of the scanned beams. As a result of the polygon rotation, the exposure and reference beams are scanned across the write platen and reference mask, respectively.

The controller in the preferred embodiment comprises such processor and memory means as necessary to perform the functions detailed herein. As noted above, the controller supervises the rotation of the polygon scanner and provides signals to the acousto-optic modulator 28.

The optical configuration of the reference mask comprises alternating optically transmissive and reflective regions. Therefore, as the reference beam is scanned across the mask by the rotating polygon, the photodetector array will receive a modulated optical beam. The modulation signal of the beam is indicative of the beam position. The photodetector system output signal is used by the controller to generate a clock or timing signal. Since the dimensions of the artwork in the scan direction are a function of the rate of modulation provided by the modulator (and ultimately the frequency of the clock signal), an increase in the clock signal period results in a proportionate expansion of the dimension of the artwork along the scan line.

Known laser scanning systems receive the reference beam in a detector mechanism which comprises a reference mask followed by a linear array of optical fibers that converts a line spatial distribution to a circle where there is one or more photodetectors. As is well known, the reference mask comprises an array of opaque bars forming alternating reflective and transmissive regions. The modulated reference signal is received by the photodetectors, and is ultimately used to generate a scan timing signal. The modulated reference beam comprises an optical signal that has a very large length to height aspect ratio since the reference beam is quite small in diameter when compared to the scan length of approximately twenty (20") inches. The quality and alignment of the fiber optic bundle are critical since fiber transmission variations can cause erroneous scan timing information.

The information in the reference beam is encoded once the modulated reference beam exits the reference mask. The function of the optical fibers is simply to provide a convenient mechanism for routing the optical signal to the photodetectors. There is no need to maintain the positional relationship of the beam with respect to the reference mask, since beam position information is totally encoded as an intensity change.

Figure 2:
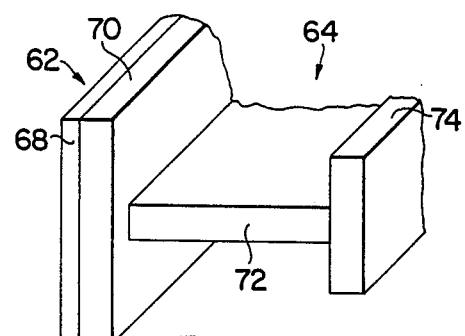
FIG. 2 is a perspective view of a portion of the laser raster scanner of FIG. 1.

Referring now to FIG. 2, there is illustrated a portion of the detector assembly 64 of FIG. 1. The reference mask 62 includes an element 68 on which is formed the spaced bars which provide the optical modulation. These can be on either the front or back side of the element 68 substrate. The reference beam passes through the glass element modulating the beam as it is scanned lengthwise along the detector. The modulated reference beam is received by a diffuser 70 which spreads the beam. It is preferable that the diffuser comprise a conventional frosted glass but other types of optical diffusers may be equivalently substituted. The diffused, modulated reference beam is received in the preferred embodiment by an optical collector or collection light guide 72, such as a light pipe or equivalent which presents the beam directly to a photodetector array 74.

The photodetector array is comprised of an array of photodetector configured on a printed circuit board and spaced at approximately one-inch (1") intervals. The separation of the photodetectors is quite large compared to the separation of the reference mask transparent regions. Typically, the photodetector separation is about one thousand times greater than is the separation between reference mask transparent regions. In the preferred embodiment, the optical diffuser sufficiently diffuses the modulated reference beam over the length of the collector so that the diffused, modulated reference beam will strike at least two photodetectors simultaneously at every position as the beam traverses along the length of the photodetector array. As detailed in FIG. 3, the collection light guide constrains beam 75 divergence in the vertical plane by total internal reflection so that all of the radiation is collected in the vertical dimension.

Figure 3:
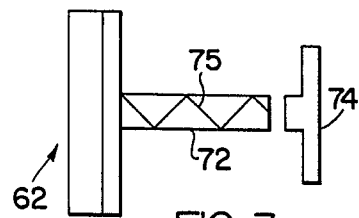
FIG. 3 is a side illustration of the detector assembly of FIG. 2 showing a representative light beam path.
Figure 4:
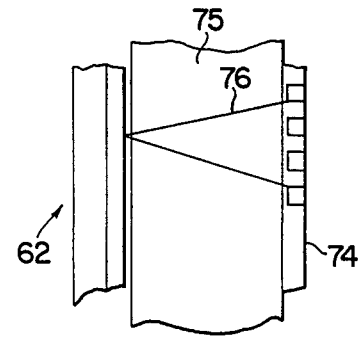
FIG. 4 is a top view of the detector assembly portion of FIG. 3 illustrating the diffusion angle of the reference beam.

FIG. 4 is a top view of the portion of the detector assembly in FIG. 3 showing the diffusion angle 76 through which the reference beam is spread as it traverses the collection light guide. The electrical signal output by the photodetector array will then be the electrical sum of all the individual photodetector outputs that is a time varying sinusoid which, when received by appropriate circuits in the controller, will be reconverted to a timing signal to be used by the controller in scanning the substrate in the manner described above.

Those skilled in the art will note that the components of the detector assembly are inexpensive and do not require the great precision needed with a linear array of optical fibers. Since no information can be lost by diffusing the modulated reference beam, the use of the diffuser allows for the elimination of the fiber optic bundle and the large area, high speed photodetectors which otherwise would be required to receive the modulated reference beam. This marks a point of departure of the present invention over the prior art.

Similarly, although the invention has been described hereinabove with respect to a preferred embodiment thereof, it should be understood by those skilled in the art that various changes, omissions and additions thereto may be made therein without departing from the spirit and scope of the invention.

I claim:

1. In a laser raster scanner that simultaneously scans, along respective scan lines, a reference beam across a reference mask having spaced optically transparent regions and an exposure beam across a substrate, an apparatus generating signals indicative of a scanned rate of said beams, comprising:

a means positioned subsequent to and registered with the reference mask for optically diffusing said reference beam so as to constrain the reference beam generally along the reference scan line; and a detector means registered with and subsequent to said diffuser means, including a plurality of photodetectors spaced along said reference beam scan line, said detector means for receiving said reference beam and providing electrical signal equivalents thereof.

2. The apparatus of claim 1 wherein said photodetectors have a separation that is approximately one thousand times greater than the separation of said reference mask optically transparent regions.

3. The apparatus of claim 1 wherein said diffused reference beam is simultaneously received by at least two of said photodetectors.

4. In a laser raster scanner that simultaneously scans, along respective scan lines, a reference beam across a reference mask having spaced optically transparent regions and an exposure beam across a substrate, an apparatus generating a scan timing signal, comprising:
   a means positioned subsequent to the reference mask for optically diffusing said reference beam so as to constrain the reference beam generally along the reference scan line;
   a detector means registered with and subsequent to said diffuser means, including a plurality of photodetectors spaced along said referenced scan line whose outputs are electronically summed, for receiving said reference beam and producing electrical signal equivalents indicative of the position of the reference beam along the scan line; and
   a controller receiving said photodetector signals and providing therefrom a scan timing signal, said controller for scanning said reference and exposure beams in accordance with said scan timing signal.

5. The apparatus of claim 4 wherein said photodetectors have a separation that is approximately one thousand times greater than the separation of said reference mask optically transparent regions.

6. The apparatus of claim 4 wherein said diffused reference beam is simultaneously received by at least two of said photodetectors.

7. The apparatus of claim 6 wherein said photodetector signal comprises a raised time varying sinusoid signal and wherein said controller converts the photodetector signal to a digital clock signal.

8. In a laser raster scanner that simultaneously scans, along respective scan lines, a reference beam across a reference mask having spaced optically transparent regions and an exposure beam across a substrate, a method for generating a scan timing signal comprising the steps of:
   diffusing the reference beam subsequent to the reference mask so as to constrain the reference beam generally along the reference scan line;
   detecting the diffused reference beam at spaced intervals along the scan line and providing an electrical signal equivalent thereof;
   generating a scan timing signal in accordance with said electrical signal equivalent for controlling the scanning of said reference and exposure beam.

* * * * *